L. H. BRINKMAN.
FLEXIBLE TUBE.
APPLICATION FILED NOV. 18, 1915. RENEWED FEB. 20, 1920.
1,387,231.
Patented Aug. 9, 1921.
3 SHEETS—SHEET 3.
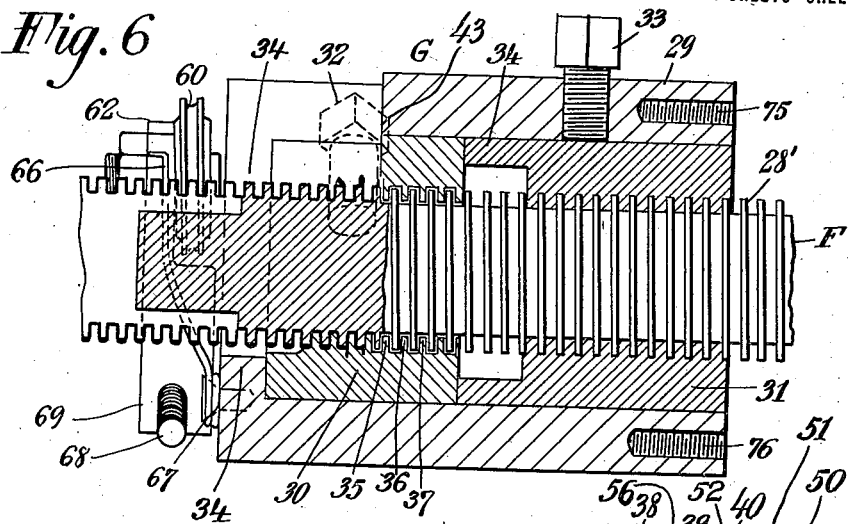
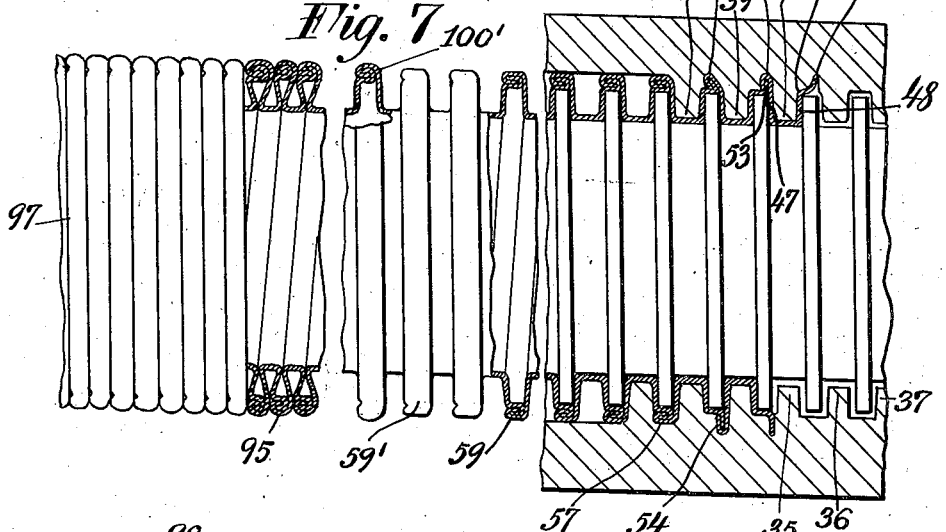
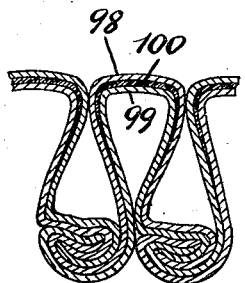
Louis H. Brinkman, Inventor
By his Attorney
Thomas Howe

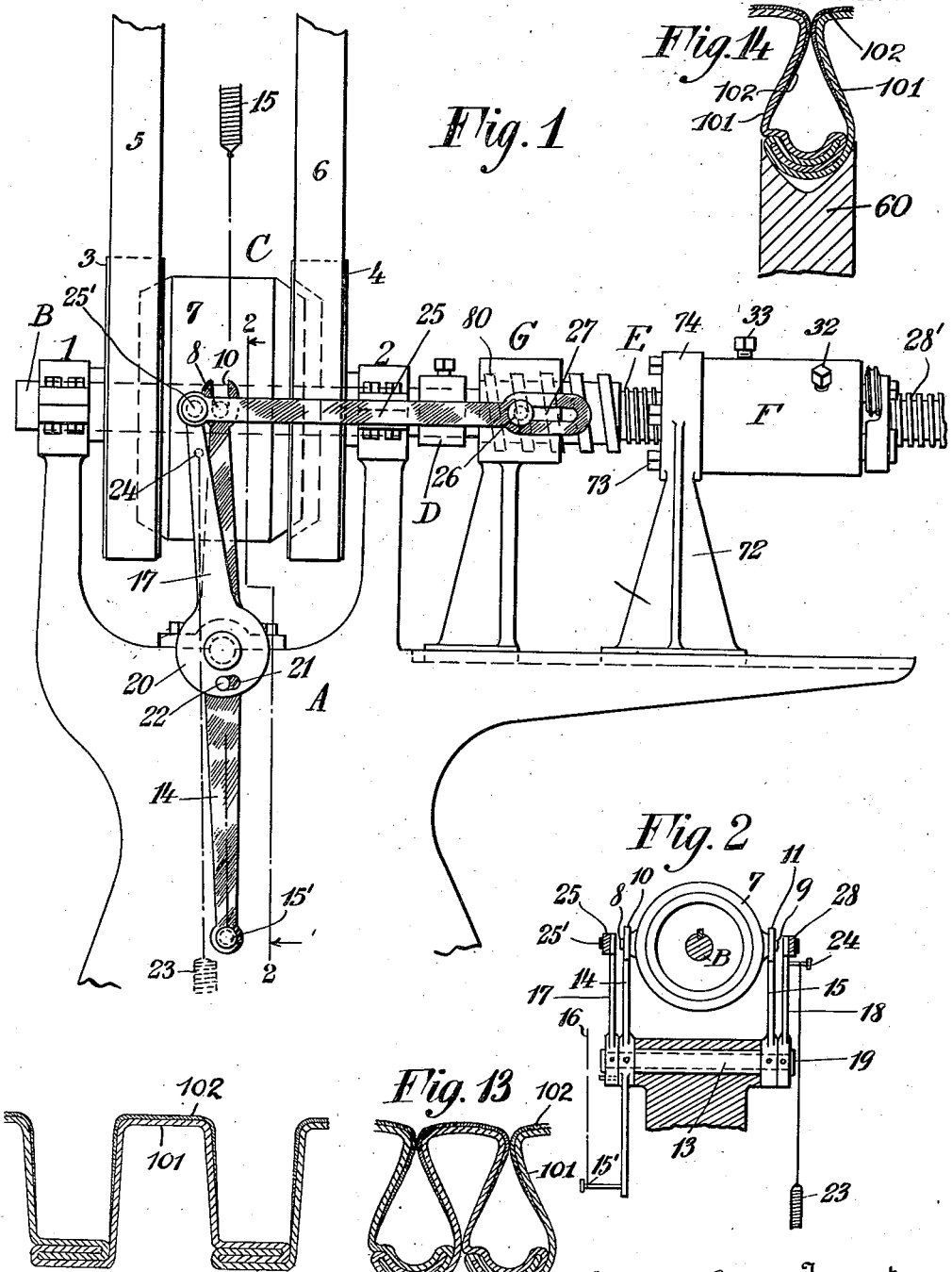

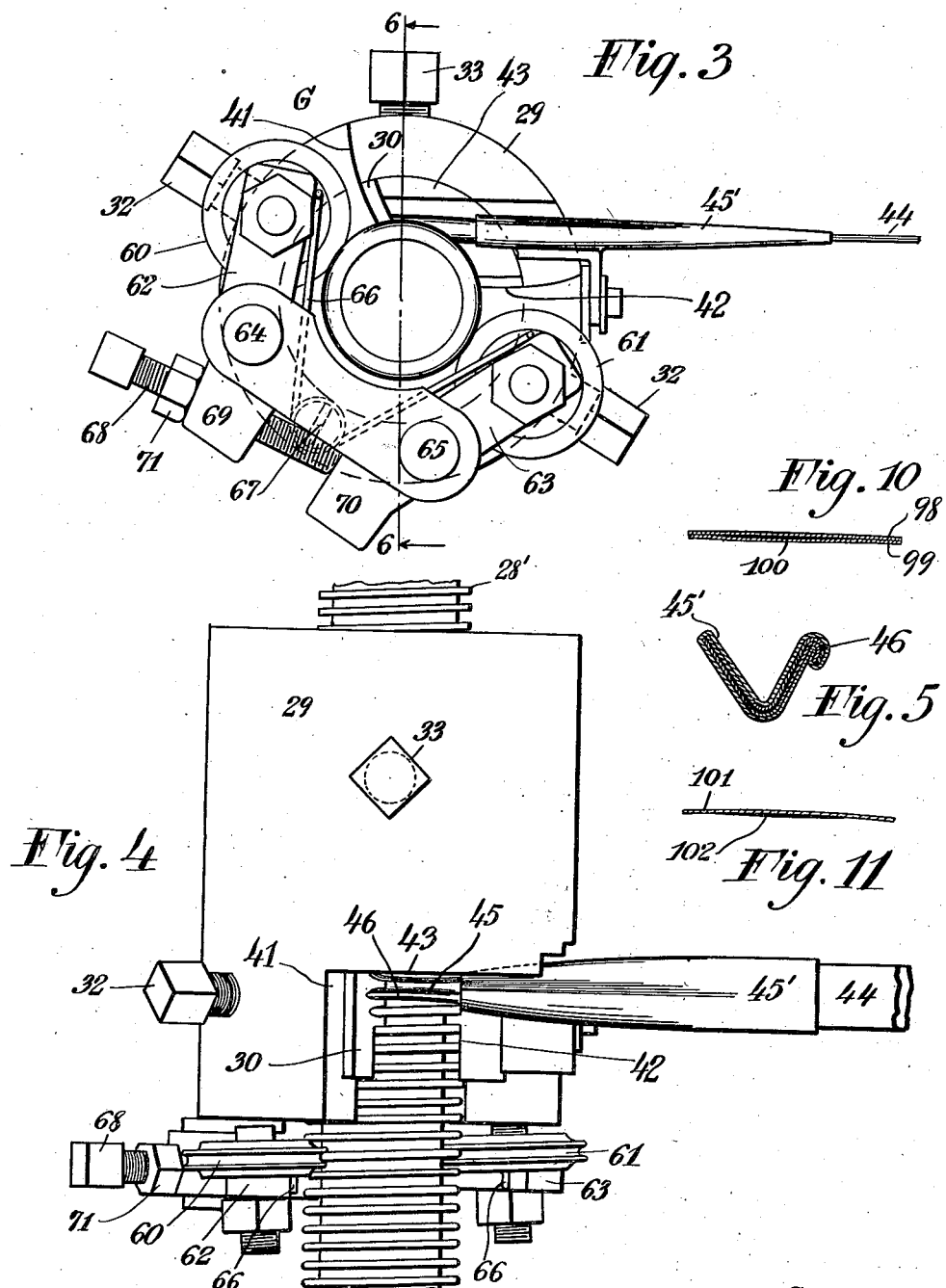

UNITED STATES PATENT OFFICE.

LOUIS H. BRINKMAN, OF GLEN RIDGE, NEW JERSEY, ASSIGNOR TO TITEFLEX METAL HOSE CORPORATION, A CORPORATION OF NEW YORK.

FLEXIBLE TUBE.

1,387,231.  Specification of Letters Patent.  Patented Aug. 9, 1921.

Application filed November 18, 1915, Serial No. 62,108. Renewed February 20, 1920. Serial No. 360,073.

*To all whom it may concern:*

Be it known that I, LOUIS H. BRINKMAN, a citizen of the United States, and a resident of Glen Ridge, in the county of Essex and State of New Jersey, have invented certain new and useful Improvements in Flexible Tubes, of which the following is a specification.

This invention relates to flexible tubes. More particularly, the invention relates to flexible tubes having grooves extending about them, flexing of the tube being permitted by relative movement of the sides of the groove.

It is desirable that such tubes shall have special characteristics in particular locations such as reinforced strength, improved elasticity, distributed bending, immunity from corrosion or other qualities.

It is the main object of the present invention to provide a structure to which the desired qualities are accurately imparted at selected locations.

A further object of the invention is to provide a tube in which the results indicated are efficiently accomplished and which lends itself to the practical and simple methods of manufacture.

Other objects of the invention will appear hereinafter.

In my application Serial No. 49,258 I have shown and described a flexible tube, grooved as above referred to, wherein the bottom of the groove is swaged so as to thicken it, the thickness tapering off in the side walls as the mouth of the groove is approached. This reinforces the strength under bending and distributes the bending along walls of the groove so that the flexing is more even and regular and undue strain is not put upon any particular location.

According to the present invention the desired reinforcement, elasticity or other quality at the desired location is accomplished by applying an auxiliary layer or layers of suitable material at the desired point. Where a tube is formed of a strip as in the tube disclosed in the application above referred to, the strip is formed of a plurality of layers and of suitable material properly proportioned. These layers may be of the same material or of different material according to the qualities desired to be imparted and are proportioned to each other to properly accomplish the desired results. Some or all of the layers or strands may be broad and thin so as to be ribbon like or some of them may be narrow and thick compared to the other or others, or may have other relative proportions or shapes.

An apparatus whereby the improved tube may be formed and also the improved tube itself in a number of modifications are illustrated in the accompanying drawings of which:

Figure 1 is a side elevation of a machine whereby the tube of this invention may be manufactured, some of the extremities being omitted so as to bring the illustration properly within the compass of the sheet and which will be readily understood from the description, with some parts in section.

Fig. 2 is a section on a reduced scale through the frame and headstock spindles on the line 2—2 of Fig. 1, looking in the direction of the arrow, the clutch and clutch shifting members being shown in elevation.

Fig. 3 is an end elevation on an enlarged scale, of the tube forming nut or die and its appurtenant apparatus.

Fig. 4 is a top plan view of the same.

Fig. 5 is an end view of the preliminary strip former feeding the strip into the forming threads of the die and screw, the view being of the end nearest the die and the strip emerging from the former being shown in section.

Fig. 6 is a section on the line 6—6 of Fig. 3, looking in the direction of the arrows.

Fig. 7 is a still further enlarged sectional view of the tube and that portion of the nut immediately involved in its formation, showing more clearly the details of construction of the tube and of its formation by the die and screw.

Fig. 8 is a still further enlarged section of a fragment of one side of the tube as it emerges from the forming nut showing more clearly the form and arrangement of the layers.

Fig. 9 is a similar section of the tube shown in Fig. 8 after being reflexed by longitudinal compression.

Fig. 10 is a transverse section of the strip which is fed into a nut in order to form the tubes as shown in Figs. 3, 8, and 9.

Fig. 11 is a transverse section of a modified form of strip before being fed into the nut.

Fig. 12 is a longitudinal section of a fragment of a tube formed of the strip as shown in Fig. 11, as it emerges from the forming nut.

Fig. 13 is a view similar to Fig. 12 showing that tube after the joints have been crimped and the groove walls have been reflexed by longitudinal compression.

Fig. 14 is sectional view of one of the pressure rollers for compressing and crimping the joint in conjunction with a section of a joint illustrating its operation thereon.

Referring to the drawings, the apparatus comprises a support or frame A upon which is mounted a headstock comprising the rotatably mounted spindle B, the reversible driving mechanism C therefor and the chuck D. Within the chuck is secured a screw-rod E carrying a screw thread which coöperates with a longitudinally movable nut F to form the tube. Also the screw rod has a thread engaging with a longitudinally moving nut G for appropriately reversing the direction of rotation of the rod.

Referring to the drawings more in detail, the spindle B of the head stock is supported in the bearings 1 and 2 and rotatably mounted upon it are the belt pulleys 3 and 4 upon which run the belts 5 and 6 driven in opposite directions by any suitable source or sources of power. Splined upon the spindle is a movable clutch member 7 which may be slid longitudinally to alternately engage the pulleys 3 and 4.

In order to shift the movable clutch member to reverse the direction of rotation of the chuck and screw rod, and to securely hold it in the position to which it may be moved, the clutch member has extending laterally from it two trunnions 8 and 9 which are embraced by the forks 10 and 11 at the ends of a yoke journaled in the frame.

The yoke comprises a sleeve 13 to the ends of which the arms 14 and 15 carrying the forks 10 and 11, are fixed. The yoke is held in position to cause driving engagement with one of the pulleys 3 or 4 by an off-center spring 16 having one end secured at 15' to an extension of the arm 14, and the other end to a suitable stationary point.

To move the yoke, the arms 17 and 18 are fixed upon a shaft 19 which passes through and is rotatable in the sleeve 13. The arm 17 is provided with a disk 20 having a slot 21 which receives a pin 22 fixed to the extension of the arm 14 of the yoke. An off-center spring 23 has one end connected to the arm 18 at 24 and has its other end secured to a fixed point. The pin 22 and slot 21 provide a connection which permits movement of the arms 17 and 18 with relation to the yoke until the spring 23 has passed center. The arms and yoke are then thrown together quickly into the position for reverse rotation, the springs 23 being stronger than the spring 16. The spring 16 serves to hold the clutch in closed position during transition movements of the shifting mechanism. The arm 17 is moved in one direction or the other by means of a link 25 which is pivoted to the arm at 25' and is connected with the nut G by a pin 26 and slot 27. The slot permits quick movement of the arm 17 after its spring has passed dead center. A similarly connected link 28 extends between the arm 18 and the nut G upon the other side. Forward and backward movement of the nut G along the rod E operates to throw the clutch member from one extreme to the other so that the direction of rotation of the spindle, chuck and screw rod is reversed at regular intervals for a purpose as will hereinafter appear.

The parts directly concerned in the formation of the tube comprise the nut F coöperating with the threads 28' on the screw rod together with appurtenant appliances. The nut comprises a steel casing 29 having a central bore adapted to receive a steel die 30 and a brass bushing 31 closely fitting against it, the die and bushing being held in position and prevented from movement with relation to the casing by means of set screws 32 and 33 as shown. It will be observed that the bore just spoken of does not extend entirely through the casing but that there is a smaller bore at one end so that the flange 34 is formed against which the die abuts. The diameter of the bore inside this flange is such as to allow the passage of the tube as formed by the die and screw. The bushing 31 may be threaded to receive the rotating screw threads with a running clearance as shown, and the steel die may have certain of its threads non-forming, as 35, 36, 37, etc., and it carries specially formed threads 38, 39 and 40 adapted to form the strip into the tube. After the tube forming threads have been passed the die has an unthreaded interior surface. To permit the strip of which the tube is formed to be fed into the die from the side, the casing 29 and the die have segments cut away as shown particularly in Figs. 4 and 5, forming a recess having side walls 41 and 32 and an end wall 43. Secured to the wall 42 of the recess is a channel or former 45' for preliminary shaping the ribbon prior to its introduction into the die. This former is flat at one end where it receives the flat ribbon 44 and at its other end is shaped as shown in Fig. 5. It will be observed that this former initiates a longitudinal groove 45 in the strip and one edge is curled over as shown at 46. The ribbon passes from the forman 45' into the die, the bottom portion of the groove being between the top of the die thread 40 and the screw at the base of the screw threads. The sides 47 and 48 extend up on both sides of the die thread 40. The side 48 has its extremity 50 bent to one side in a channel cut in the die at the base of the thread. This channel is chamfered off at 51, at the beginning, to facilitate the entrance of the strip, but soon merges into the slot which is radial of the tube and contains the flange 53. The width of this slot is such as to be substantially equal to the thickness of the edge of the ribbon or strip of which the tube is formed. Similar clearances are formed between the screw and the die at the base of the die thread and also about the die thread 40 except that at the outer face of the die thread the clearance is made larger and the adjacent ends of the clearances at the sides of the thread are made larger, gradually tapering off to clearances at the base of the die thread which are substantially equal to the thickness of the ribbon near the edges.

This increased clearance at the inner face of the die thread and at the sides as described, provides space for the increased thickness of the metal at this location. The curled over edge of the side 47 is entered within a channel 52 at the base of the die thread 40. This channel is of slightly more than the width of three edge thicknesses of ribbon at the start. The curled over portion received from the preliminary former is more sharply bent on entering the channel and consequently its tendency is to spring against the sides of the channel, leaving a clearance for one thickness of the ribbon between the sides of the bent over portion. Within this clearance is entered the radial edge 53 of the preceding convolution, this edge being radial of the tube and corresponding to the edge 50 of the convolution being considered. The strip maintains this sectional shape following the die thread 40 about the screw, except that the channel 52 is narrowed as it progresses about the screw so that the bent over edge of the strip and its embraced edge of the next convolution are pressed more closely together as shown at 54. The strip then emerges from the die into the recess and reënters the die about the die thread 39. The right hand side (as viewed in Figs. 6 and 7) is now embraced by the curled over portion of the edge of the succeeding convolution and its left hand edge, interfolded with the preceding convolution, will enter within the channel 56 cut in the die at the thread base. This channel is formed at its beginning of a section as shown at 56 with an inclined wall which bends over the interfolded edges to one side. This section is gradually merged into the section as shown at 57 as it progresses about the die until the interlocked portions are bent down and occupy the position as shown at 57, the position as shown at 57, the clearance between the die and thread being substantially equal to four thicknesses of the ribbon. In this condition the joined edges of the strip emerge from the die into the recess and are entered into a similarly shaped clearance 58 of similar depth between the die and screw threads. The joint may be then passed around the screw one or more times without changing form and the tube emerges from the nut having its sides of the groove in the strip substantially radial of the tube, the bottom of the groove upon the inside of the tube and the interfolded edges of contiguous convolutions of the strip at the outside of the groove the section of the tube being then as shown at 59 and exterior elevation as at 59. The tube then passes on between the grooved rollers 60 and 61 which bear upon the joint.

These rollers each have a groove receiving the interfolded joint. This groove is of wedge shaped section so that when the rollers are forced against the tube the joint is compressed longitudinally of the tube, thereby crimping the interfolded parts, compacting and securing the joint. The form of the groove in relation to the joint is clearly shown in Fig. 14. It will be observed the groove is so deep that there is always a clearance between its bottom and the joint to accommodate it radially as it is compressed longitudinally. It will be observed that the rollers are set in a plane which makes an angle with the longitudinal axis of the tube corresponding to the helical pitch of the strip so that the rollers are adapted to the helical form of the joint. The rollers may conveniently be rotatably mounted upon arms 62 and 63 pivoted to the end of the casing of the nut at 64 and 65. These arms are engaged by the ends of a spring 66 which tends to throw them away from the tube, the spring being secured to the end of the nut casing at its center 67. The rollers are forced against the tube by means of a screw 68 tapped into the tail 69 of one of the arms 62 and bearing against the tail 70 of the other arm 63. Obviously by turning this screw in one direction or the other the pressure of the rollers upon the tube may be made any that is desired. A lock nut 71 on the screw provides for securing the arms and rollers in adjusted position. As the rollers bear against opposite sides of the tube they have no tendency to bend it to one side or the other.

The nut F as described, is secured to the stand or support 72 sliding upon the frame. This may be done by means of machine screw 73 passing through the head 74 and tapped into the nut casing, the casing being tapped for this purpose, at 75, 76, etc. The head 74 has a central opening to permit the passage of the screw E. It will be observed that between the rollers and the end of the die threads there are several convolutions of the thread on the screw which have no corresponding threads on the die or nut casing, the die and casing presenting plain faces 78 and 79 to the screw threads.

It will now be apparent that the strip having been entered between the die and screw as indicated, the turning of the screw will frictionally grip the strip and draw it into the die so that a tube will be formed as described. The turning of the screw, however, causes the nut F to travel along the screw member, and unless the tube sections to be formed were very short, the apparatus would have to be very long to accommodate the travel of the nut. For this reason provision is made for returning the nut to its starting point at suitable intervals. This is the object of reversing the direction of rotation of the screw member as before referred to. In the case shown the forming thread on the screw member is a right hand thread, as is also the thread 80 for the nut G. As, therefore, the screw member is rotated in a clockwise direction, viewed from the headstock, the strip will be drawn in and the tube formed as described, the forming nut moving toward the headstock and the shifting nut G moving in the same direction. As the nut G moves back and forth it shifts the clutch as has been referred to.

The operation of the apparatus in its entirety may now be traced.

The end of the strip is entered in the form 45' in which it has a groove initiated and one edge curled over as described. From the former it is entered within the die or nut and at the first forming thread as described and, the screw being turned, the strip is passed through the forming threads of the die and on about the screw under the grooved rollers 60 and 61. As it enters the rollers it is of a longitudinal section as shown at 59. In passing under the rollers, the joint is crimped as before explained, the section then being shown at 100'. In passing through the forming channels, it will be observed that the clearances are such as to force the interfolded edges tightly together and the folding of one part about the other draws them tightly together at the bends so that a fixed tight joint is formed. The form as shown in section at 59 may be the final form, and for some purposes may be best, but the joint may be crimped and the tube compressed or reflexed later into a form, section of which is shown at 96. The exterior view of the tube is shown at 97.

Let it be assumed that the strip has been passed through forming channels of the die and further that the apparatus is in the phase of operation as indicated in Fig. 1. In this position the apparatus has just completed a tube forming period, the nut G is substantially at the extremity of its left hand movement (see Fig. 1) and the forming nut F is substantially at the left hand extremity of its movement. The driving clutch has been thrown to the left into engagement with the pulley 3 so that the belt 5 driving the pulley in a counter clockwise direction, viewed from the left hand end, turns the screw rod in a similar direction. This will result in the withdrawal of the screw from the nut and from the tube or strip, the latter being backed off sufficiently to release the torsional gripping between it and the screw. The nut F then moves toward the right carrying with it the strip and tube, there being no turning of the latter in this movement. During this operation, the shifting nut G is also carried to the right. At a certain point in its travel, depending upon the adjustment, the clutch member operating levers are moved past center and the clutch member is thrown to the right into engagement with the pulley 4. It will be apparent that the arrangement of levers and off-center springs is such that the shifting of the clutch is brought about practically instantaneously so that there is no material discontinuance of the operation. The pulley 4, revolving in the opposite direction from that of the pulley 3, the direction of rotation of the screw will now be reversed. As the screw thus turns, the strip will be held to it by a torsional frictional grip so that it turns with the screw, the sufficiency of this frictional grip being insured by the extra turns to the strip about the screw in addition to those turns under the forming threads. The drawing of the strip in and through the nut operates to form a groove longitudinally of the strip, winds the strip into a helical form and interfolds the edges of adjacent convolutions, forcing these edges tightly together so that a fixed and fluid tight joint is formed. The tube then passes on under the rollers 60 and 61 as before described. During this operation it being observed that the screw does not move longitudinally, the forming nut moves to the left (see Fig. 1) the screw and strip turning within it. This is kept up as long as the screw is turned in the direction indicated.

During the left hand travel of the forming nut the shifting nut G is carried to the left until, at a certain predetermined point, the driving clutch is again shifted to the position shown in the drawings. The parts of the machine will then occupy positions as shown in Fig. 1 and a cycle of operation has been completed and may be repeated indefinitely as long as may be desired to operate the machine.

The tube, of section as shown at 59, as it is delivered by the forming nut and screw may, as before stated, be used as it is, but it is desirable that it be compressed axially for instance, by passing a rod through it, the rod having nuts at the ends of the tube.

Pressure is then brought to bear on the ends of the tube by turning the nuts and the tube may thus be compressed longitudinally. The grooved walls may thus be reflexed and the tube formed to have a longitudinal section as shown at 95 and an exterior as shown at 97. Also the tube might be compressed in a hydraulic press or in other suitable ways. It is also desirable that the joint be crimped.

The strip from which the tube shown in Figs. 7, 8, and 9 is formed is shown in Fig. 2, and is made of three layers, layers 98 and 99 are of brass between which is included an elastic transversely tapering layer 100 of spring steel. It will be observed that the center line of the steel layer is at one side of the center line of the strip. This is for the reason, as clearly illustrated in Figs. 8 and 9, that a greater width of one edge of the strip is used up in making the interfolded joints than is consumed for this purpose at the other edge of the strip. It will be seen that in this particular construction the steel layer does not enter into the interfolded joints but provides a reinforcement which supplies elasticity in the groove walls. The tube is less liable therefore to develop a set when it is flexed but returns to its initial condition, also opposes a greater resistance to elongation under pressure, and is stronger. Inasmuch as the steel does not enter into the interfolds they are more easily made of the more easily workable brass which will take and hold the desired set to produce relative immovability of the interfolded parts and insure tightness of the joint. Further the brass will protect the steel from the corrosive action of many fluids which might be conducted through the tube. The transverse tapering of the strip from the center toward its edges gives a desirable distribution of elasticity and also distributes the bending moment properly along the walls of the groove.

Fig. 11 shows a modified form of strip comprising two layers, it being similar to the strip shown in Fig. 10 except that the bottom layer is removed, the modified form of strip having the layer 101 and the transversely tapering layer 102 of suitable spring metal. Where the tube is used to convey fluids having corrosive action on steel, this layer is preferably made of spring brass. In forming the tube this strip is fed into the apparatus with the spring metal layer lowermost so that the spring metal is upon the inside and the other layer upon the outside of the tube so that the spring metal may efficiently act to prevent elongation, and at the same time acting to prevent set of the tube under flexure.

While the invention has been illustrated in what are considered several of its best modifications, and also an apparatus by which it may be formed, has been shown, it is to be understood that the invention may have other embodiments without departing from its spirit, and may be manufactured by other apparatus, than those shown in the drawing.

What I claim is:

1. A flexible tube having a groove extending about it, flexure of the tube being permitted by relative movement of walls of the groove and an auxiliary layer in strip form helically wound in a wall of the groove, said layer bending transversely as the groove walls relatively move.

2. A flexible tube having a groove extending about it, flexure of the tube being permitted by relative movement of walls of the groove and an auxiliary layer in strip form helically wound in the bottom and at the sides of the groove, said layer bending transversely as the groove walls relatively move.

3. A flexible tube having a groove extending about it, flexure of the tube being permitted by relative movement of walls of the groove and an auxiliary layer in the bottom and at the sides of the groove, said layer being thickest at the bottom and tapering along the edges.

4. A flexible tube having a groove extending about it, flexure of the tube being permitted by relative movement of walls of the groove and an auxiliary transversely tapering layer in a wall of the groove.

5. A flexible tube having a groove extending about it, flexure of the tube being permitted by relative movement of walls of the groove and an auxiliary layer in a wall of the groove, the auxiliary layer being of greater elasticity than the remaining material of the walls of the groove.

6. A flexible tube having a groove extending about it, flexure of the tube being permitted by relative movement of walls of the groove and an auxiliary steel layer in a wall of the groove.

7. A flexible tube comprising a helical strip having edges of adjacent convolutions interfolded and said strip having a longitudinal groove or fold, said strip being formed of layers and comprising a layer of less width than other layers.

8. A flexible tube comprising a helical strip having edges of adjacent convolutions interfolded and said strip having a longitudinal groove or fold, said strip being formed of layers and comprising a transversely tapering layer.

9. A flexible tube comprising a helical strip having edges of adjacent convolutions interfolded, said strip having a longitudinal fold or groove and comprising a plurality of layers of different materials.

10. A flexible tube comprising a helical strip having edges of adjacent convolutions interfolded, said strip having a longitudinal groove and formed of layers one of which layers is outside the interfolded portions.

11. A flexible tube comprising a helical strip having edges of adjacent convolutions interfolded, said strip having a longitudinal fold or groove and being formed of two layers of brass including a transversely tapered narrower layer of steel.

12. A flexible tube comprising a helical strip having edges of adjacent convolutions interfolded, said strip having a longitudinal groove and formed of layers one of which layers is of different material from other of the layers and outside the interfolded portions.

13. A flexible tube comprising a helical strip having edges of adjacent convolutions interfolded, said strip having a longitudinal groove and said interfolded edges being crimped by longitudinal pressure.

14. A flexible tube comprising a helical strip having edges of adjacent convolutions interfolded, said strip having a longitudinal groove, and said interfolded edges being crimped.

15. A flexible tube comprising a helical strip having edges of adjacent convolutions interfolded, said strip having a longitudinal groove, and said interfolded edges being compacted by crimping pressure.

16. A flexible tube comprising a helical strip having edges of adjacent convolutions interfolded, said strip having a longitudinal fold or groove and comprising a plurality of layers.

Signed at New York city in the county of New York and State of New York this 17th day of November, A. D. 1915.

LOUIS H. BRINKMAN.